Aug. 11, 1959

J. B. STRALEY 2,898,881

APPARATUS FOR SPRAYING WAXY SUBSTANCES ONTO FRUIT SURFACES

Filed Nov. 30, 1955

JAMES B. STRALEY,
INVENTOR.

BY

ATTORNEY.

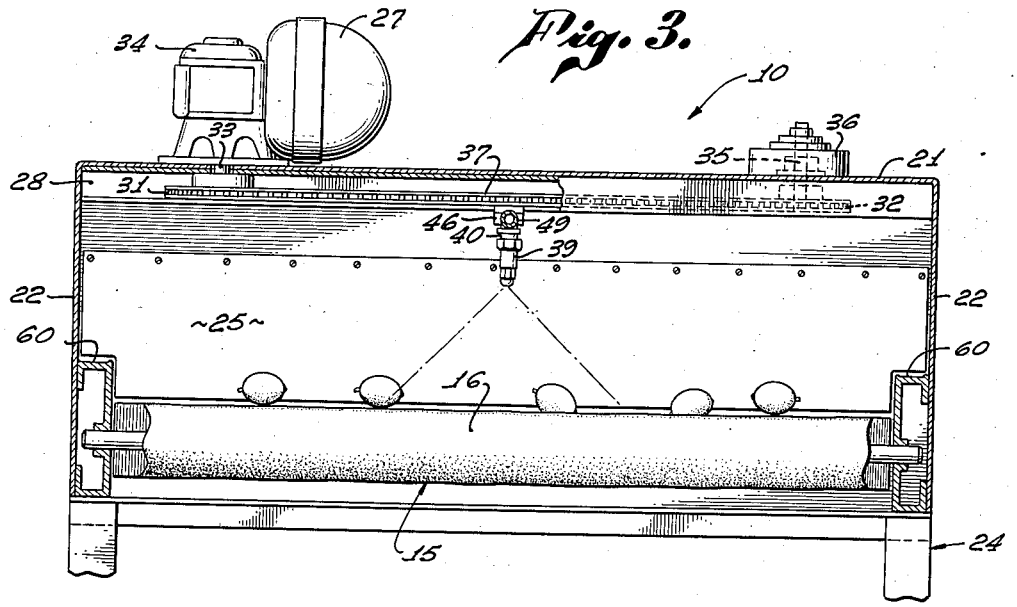
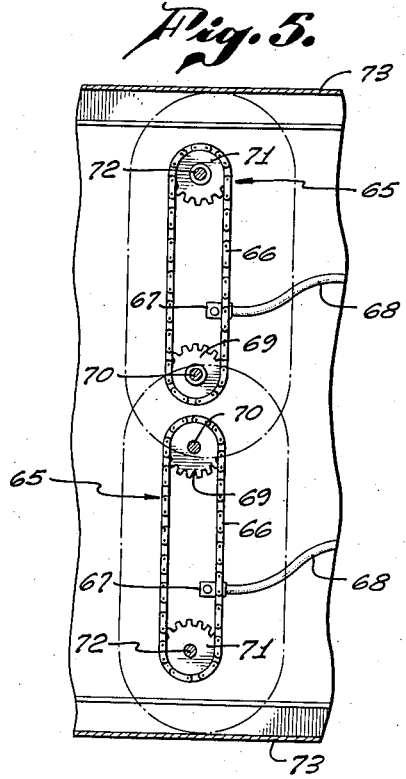
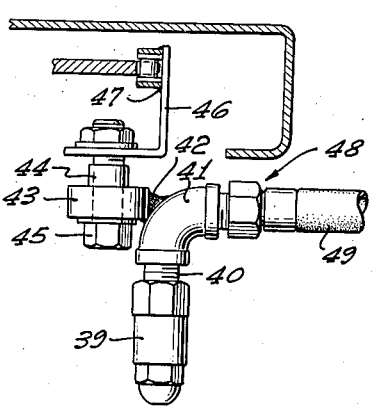

United States Patent Office 2,898,881
Patented Aug. 11, 1959

2,898,881

APPARATUS FOR SPRAYING WAXY SUBSTANCES ONTO FRUIT SURFACES

James B. Straley, Pomona, Calif., assignor to Brogdex Company, Pomona, Calif., a corporation of California Application November 30, 1955, Serial No. 550,031

13 Claims. (Cl. 118—24)

This invention relates to an apparatus and a method of applying a liquid containing a concentrated substance to surfaces of an object, in this instance to citrus fruit for the purpose of enhancing their appearance and for retarding rate of shrinkage of the fruit during marketing. More particularly, the invention relates to a novel arrangement for uniformly applying under superatmospheric pressure a spray of atomized particles of a concentrated aqueous solution of resin and emulsion of wax to surfaces of fruit.

Prior proposed apparatus and methods of treating citrus fruit have included numerous and various disadvantages depending upon the type of material applied to the fruit. In some prior instances a waxy material in a volatile organic solvent was applied. The presence of the solvent required careful control and if not properly controlled tended to burn the skin of the fruit or caused and undesirable build-up of waxy material on the fruit. Some prior proposed methods of treating citrus fruit employed a dilute solution of waxy material and relatively large quantities of the dilute solution were used. Such large quantities thoroughly wet the fruit, with the result that drying time was considerably increased. The last mentioned arrangement presented a problem of properly disposing of and controlling excess material used. Still other prior proposed methods included the use of additional air under pressure with nozzle means to control the path of atomized particles from the nozzle and to facilitate drying of the fruit. In substantially all of the prior proposed methods and apparatus fixed nozzles were used to produce a spray of atomized particles which were directed toward the fruit. Such fixed nozzles required frequent adjustment and cleaning since their presence in an atmosphere fogged with atomized particles produced build-up of treating material on the nozzles which changed their nozzle characteristics. In another prior proposed arrangement the materials to be applied were first directed onto an applicator roll and said applicator roll then transferred the material to fruit passing between the applicator roll and a series of conveyor rolls.

The principal disadvantage of all the prior arrangements was that a uniform coating of material on each fruit was difficult to achieve and it was difficult to exactly meter or measure the amount of material to be used for a given number of boxes of fruit. In addition, the presence of fixed nozzles necessitated relatively uniform tumbling or agitation of a fruit so that all of its surface would be presented to atomized spray coming from a fixed location.

This invention contemplates a novel apparatus and method of applying under high pressure a liquid containing a concentrated resin wax composition in aqueous emulsion to the surfaces of fruit wherein a single atomizing nozzle means is rapidly oscillated transversely of the path of travel of the fruit and for a selected portion of the width of said path so as to direct atomized spray downwardly and sidewardly to each fruit and to subject fruit to a predetermined minimum number of passes of said spray. The invention contemplates oscillating such a nozzle means along parallel spaced apart transverse paths so that an effective lengthened treating zone is provided by the spray pattern of the nozzle means. The invention contemplates such an apparatus wherein atomized spray from an applicator nozzle means is not only directed downwardly against a fruit but because of rapid transverse movement of the nozzle, atomized particles have imparted thereto a sidewise motion which is effective in applying waxy particles to a greater area of a fruit surface and into depressions in the fruit surfaces.

It is therefore the primary object of this invention to design and provide a novel apparatus and method of applying a liquid containing a concentrated substance to surfaces of fruit as they move along a given path of travel.

An object of this invention is to design and provide a means for applying a concentrated substance to surfaces of fruit so as to cover all of the fruit surface with a substantially uniform coating of the substance.

Another object of this invention is to disclose and provide an apparatus for application of a liquid containing a resin wax composition substance to surfaces of fruit wherein an applicator means includes a nozzle rapidly oscillatable transversely of a given path of travel of the fruit.

Still another object of this invention is to disclose and provide an apparatus as above described wherein an applicator nozzle means is rapidly transversely movable along parallel paths spaced apart a selected distance correlated to the spray pattern of said nozzle so that a selected predetermined area may be covered by said nozzle means.

A further object of this invention is to disclose and provide such an applicator nozzle means as described above wherein the width of the path of travel of fruit may be traversed by one or more nozzle means.

The invention contemplates the use of a single atomizing nozzle means movable transversely to a path of travel of fruit and adapted to emit atomized particles of a concentrated aqueous wax resin composition upon surfaces of a fruit, the nozzle being spaced from said fruit a distance such that particles of said atomized wax resin composition will impinge against fruit surfaces under pressure.

Still another object of this invention is to disclose and provide a novel method of applying liquid substances to fruit surfaces wherein atomized particles of said liquid substance are forcibly directed downwardly against fruit surfaces and at the same time are provided with a sidewardly directed force component for reducing to a minimum surface areas on said fruit normally not contacted by fixed spray patterns.

The invention contemplates a simple inexpensive apparatus to apply a concentrated liquid substance to fruit, said apparatus comprising a single atomizing nozzle means carried by and pivotally mounted upon an endless chain disposed with lays of said chain transverse to and equally spaced from the path of travel of the fruit. The rate of speed of the chain is correlated to the rate of speed of fruit passing therebeneath so that said nozzle means may normally pass a selected fruit not less than three times and preferably four to five times to subject it to an atomized spray of the liquid substance.

These and other objects of this invention will be readily apparent from the following description of the drawings.

In the drawings:

Fig. 3 is a transverse vertical sectional view taken in a plane indicated by line III—III of Fig. 1;

Fig. 4 is an enlarged fragmentary view, partly in section, of a nozzle means pivotally mounted on chain means shown in Fig. 1; and Fig. 5 is a top fragmentary view of a different modification of this invention, the view being partly in section.

Figure 1:
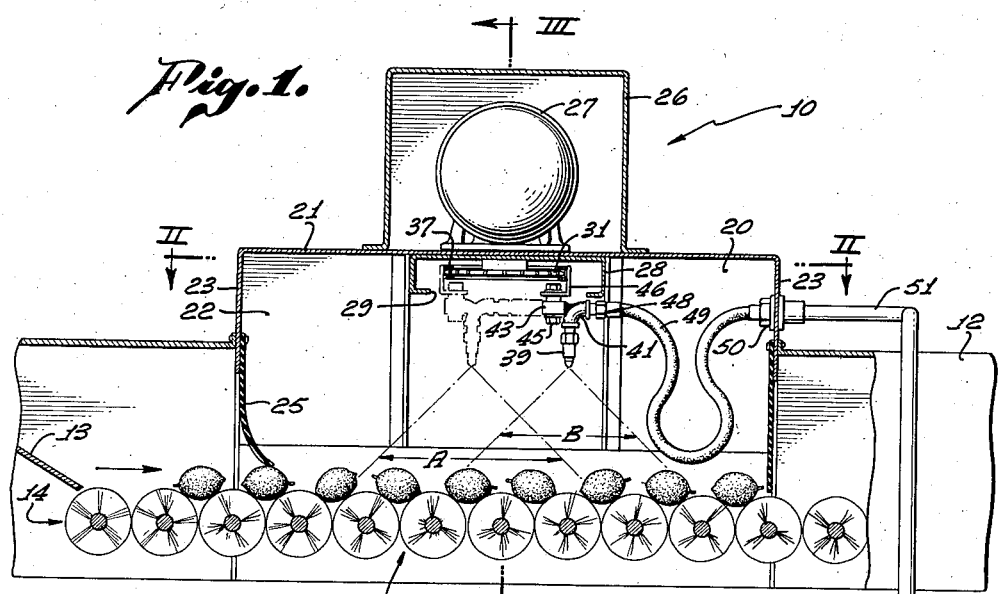
Fig. 1 is a sectional view of an apparatus embodying this invention, the section being taken longitudinally of a treating zone.
Figure 2:
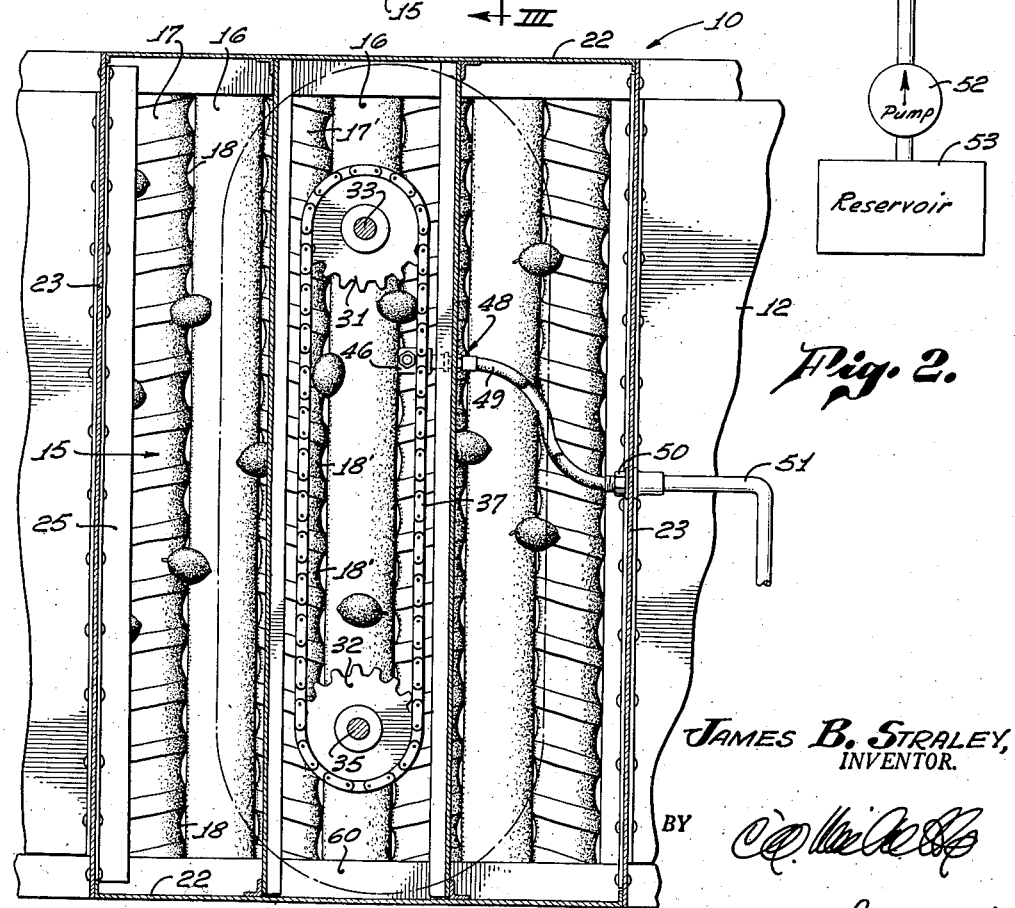
Fig. 2 is a sectional view taken in a horizontal plane indicated by the line II—II of Fig. 1.

An apparatus embodying this invention is generally indicated at 10 in Fig. 1, and may be located between an inspection table located at the left of Fig. 1 (not shown) and a drying zone indicated at 12. Fruit to be treated, for example, lemons as shown, may be dumped from storage boxes onto the inspection table for sorting out any defective fruit. The fruit is conveyed at a selected speed along said table by suitable belt conveyor means and may be discharged along an inclined ramp 13 to a series of brush rolls generally indicated at 14 and located adjacent apparatus 10. The brush rolls 14 may brush and clean surfaces of the fruit as they are passed thereover so that said surfaces are in condition to receive an application of liquid substance by the apparatus of this invention. Although only a pair of brush rolls 14 are illustrated, it is understood that a selected number of such rolls may be employed.

Fruit is conveyed by a plurality of brush rolls 15, similar to rolls 14, through a treating zone defined by apparatus 10. The brush rolls 15 may comprise alternately arranged plain cylindrical rolls 16 and sculptured rolls 17 provided with a shallow spiral groove or indentation 18 therein. In one roll 17 groove 18 may be pitched or turned in one direction while in a roll 17' located on the opposite side of a plain roll 16 a spiral groove 18' may be pitched or turned in the opposite direction so that a fruit advanced by said rolls will be tumbled and turned about its several axes so as to cause said fruit to present virtually all of its surface areas to a spray application. The rolls 16, 17 and 17' may be driven at a selected rate of speed by well known means (not shown) and will advance said fruit through the treating zone and into the drying zone 12.

Above rolls 15 may be provided a treating chamber 20, said treating chamber being defined by a top wall 21, side walls 22 and end walls 23, said walls being made of any suitable material such as sheet metal connected together in well known manner and supported from a frame structure 24. The end walls 23 terminate in spaced relation to the rolls 15. Attached to each end wall 23 may be a transversely extending depending flag or flap 25 which extends downwardly to approximately the top surface of rolls 15. The flags 25 may be made of any suitable compliant flexible material so that fruit conveyed by rolls 15 will easily pass therebeneath while at the same time atmosphere within treating chamber 20 is substantially confined therein. Above top wall 21 may be mounted a cover 26 for a motor 27.

A downwardly facing transverse member 28 of C-section may be supported from frame 24 through side walls 22, said member 28 providing a transversely disposed elongated opening 29 below top wall 21 and above rolls 15. Supported by the member 28 in transversely spaced relation may be a pair of sprockets 31 and 32 of selected diameter. Sprocket 31 may be connected in well known manner to a lower end of a drive shaft 33 which extends downwardly from a reduction gear means 34 operably connected to the shaft of motor 27. The sprocket 32 may be carried by a depending idle shaft 35 mounted from member 28 and top wall 21 by any suitable bearing means indicated at 36. The sprockets 31 and 32 carry a horizontally disposed endless chain 37. Chain 37 is driven by motor 27 at a selected rate of speed correlated to the rate of speed of rolls 15 and fruit advanced thereby as hereinafter described.

Apparatus 10 also includes a single nozzle means 39 for downwardly directing a transversely reciprocally moving cone-shaped spray of atomized particles of an aqueous liquid substance upon fruit passing therebeneath upon the rolls 15. Nozzle means 39 may be of any well known make and manufacture and comprises a single orifice of selected size. The nozzle means 39 may be supported with its axis vertical from a nipple 40 connected to a 90° elbow 41 which may be secured as by welding at 42 to a swivel ring 43 antifrictionally mounted upon a sleeve bushing 44 carried by a bolt assembly 45. Bolt assembly 45 is connected to an L-shaped clip 46, the vertical leg of said clip 46 being secured as by welding at 47 to one element to chain 37.

The elbow 41 may be connected to a hose coupling generally indicated at 48 provided at one end of a flexible reinforced hose member 49. Hose member 49 is of sufficient length so as to maintain connection to nozzle means 39 as the nozzle means is rapidly driven along the path of endless chain 37 and around each sprockets 31 and 32. The opposite end of hose member 49 may be secured by a suitable fitting 50 to end wall 23, said fitting 50 extending through wall 23 and providing a connection to a hose member 51. Hose member 51 is diagrammatically illustrated in fluid communication with a fluid pump 52 connected to a reservoir tank 53 containing a concentrated liquid substance to be applied to the fruit. Pump 52 is operable to pump a liquid substance from reservoir 53 at relatively high pressure, as for example 80 p.s.i.

The pivotal or swivel mounting of nozzle 39 with respect to chain 37 permits the nozzle to readily pass around each of said sprockets 31, 32, and to travel in a path alongside both lays of endless chain 37 without disturbing the connection of nozzle means 39 to hose member 49 and hose member 49 to fitting 50. In effect, hose member 49 waves back and forth in wigway manner about fitting 50 as the nozzle means 39 rapidly traverses the path of advancement of the fruit.

Nozzle means 39 emits a spray of atomized particles in a vertical cone-shaped pattern which may include a vertex angle of about 90°. Nozzle means 39 is spaced above the fruit a distance such that the spray pattern is intact when particles thereof impinge on fruit surfaces. The vertical spacing of nozzle means 39 above the fruit, the horizontal spacing of the lays of chain 37 as determined by the diameter of the sprockets, and the fluid pressure selected for supplying the liquid substance to the nozzle means establishes a spray-treating zone indicated by phantom lines in Fig. 2 and which comprises a first transverse spray zone A (Fig. 1) and a second transverse spray zone B. Zones A and B overlap a preselected amount determined by the above factors and by the rate of advancement of the fruit so that each fruit is subjected to three or more passes of the nozzle means as later described.

Ends of the treating zone are generally semicircular in shape and lower margins of the spray pattern may extend beyond ends of brush rolls 15. To collect and facilitate disposal of such end spray, gutter means 60 may be provided along each side of the treating chamber, said gutter means being slightly inclined and removably secured to side walls 22.

The concentrated liquid substance contained in reservoir 53 may be a concentrated aqueous solution of resin composition and emulsion of suitable waxy materials. The concentrated liquid substance is preferably an aqueous solution or emulsion with proporties of inhibiting dehydration of the fruit to which it is applied and of drying to a bright shiny glossy surface so as to enchance the appearance of the fruit. It is understood that other suitable concentrated aqueous solutions or emulsions of selected materials may be employed with the applicator means of this invention. The liquid substance may have any selected property for spraying upon an object or article, even other than fruit, to form a thin deposition of automized particles thereon for a selected purpose.

Although Figs. 1, 2 and 3 illustrate only a few fruit in the treating chamber, it is understood that such illustration is for purposes of clarity and that normally a large quantity of fruit would be advanced through the treating chamber by the rolls 15. Such fruit is advanced through the treating chamber 20 at a preselected speed by rolls 15 and agitated thereby as they are moved along a given path. As fruit is so advanced, endless chain 37 is driven at a preselected speed so that the single nozzle means 39 is rapidly transversely moved over and across the fruit in spaced paths. Rapid movement of the nozzle means in such paths parallel to chain 37 produces in effect oscillation or reciprocation of nozzle means 39 across the path of the fruit. The rapidity of oscillation as defined by the number of cycles per minute at which the nozzle means is driven about its circuit on chain 37 is directly correlated to the linear rate of advancement of fruit along its given path on rolls 15. The speeds are so correlated that during the time required for a fruit to pass through the treating zone of the nozzle means such a fruit will be subjected to overhead bombardment of spray particles from nozzle means 39 a minimum of at least three times and preferably four or five times or more. Such correlation of speed provides flexiblity in the applicator means so that the nozzle means may be readily adapted to and adjusted to treating chambers of various widths. Thus a greater width of path of the fruit for a given rate of advancement of fruit would require a greater speed of chain 37. In some instances, sprocket diameter may be increased so as to provide a somewhat longer treating zone.

In detail, when nozzle means 39 moves along the front lay of chain 37, it will produce a rapidly transversely moving intact cone-shaped spray pattern successively covering a total area indicated by zone A in Fig. 1. Since the atomized particles are ejected from the nozzle means, under relatively high pressure, such particles forcibly impinge against upwardly facing fruit surfaces at the time nozzle means 39 passes thereover. Such spray pattern has imparted to each atomized particle a sideward component of force which causes said particles to also impinge against side surfaces of fruit therebeneath facing the nozzle means. As nozzle means 39 is carried around a sprocket and transversely moves in the opposite direction across the path of travel of fruit and alongside the rear lay of chain 37, the spray is also directed downwardly and rapidly moved across fruit surfaces at a more advanced point in the travel path of the fruit. The sideward component of force imparted to atomized particles as the nozzle means moves along the rear lay of chain 37 produces bombardment of other side surfaces of the fruit by impingement thereagainst of said atomized particles. Thus it will be readily understood by those skilled in the art that fruit passing through the treating zone is subjected to impingement of atomized particles from the single nozzle means 39 which are directed against it not only in a downward direction but also from first one side and then the other side. As a fruit passes through the entire treating zone, it is subjected to more than one bombardment cycle. Since the fruit is being agitated and turned about its axis in the treating zone, it has been found that substantially all surfaces of the fruit are subjected to deposition of spray particles and that such is quite uniform. Because the particles are directed thereagainst under high pressure and the solution is in concentrated form, this method of applying a liquid substance to surfaces of fruit is economical because less material is used and less time is required to evaporate the aqueous deposition of concentrated atomized particles in a subsequent drying zone.

It should also be noted that the atomized particles may produce an atmosphere within the treating chamber of somewhat foggy characteristics and that such foggy atmosphere is minimized by reason of the forceful impingement under pressure of the particles onto the surface upon which deposition thereof is desired. Some particles in the foggy atmosphere in areas outside of the treating zone as defined above will be deposited on the fruit surfaces, but not in the positive manner provided by the direct impingement of particles emitted by the nozzle means.

It will also be apparent that in and out of the treating zone atomized particles will be limitedly deposited upon brush rolls 15 and such brush rolls in contact with fruit surfaces will tend to wipe said surfaces with particles deposited thereon. Application of concentrated liquid substances by the rapidly moving single nozzle means has reduced accumulation of particles on the rolls 15 and has more efficiently applied the concentrated liquid substance to fruit surfaces.

In Fig. 5 is illustrated a different modification of the apparatus of this invention. In the modification shown in Fig. 5, a pair of transversely aligned sprocket and chain means 65 are provided in place of the single sprocket and chain means 31, 32, 37. In Fig. 5, each endless chain 66 carries a single nozzle means 67 in fluid communication with a flexible hose 68 in communication at one end with a suitable supply source of liquid substance to be applied, such not being shown because it is similar to that described above in the first embodiment. Inner sprockets 69 of sprocket and chain means 65 are positioned in relatively close adjacent relation and may be supported from drive shafts 70, said drive shafts 70 being operably interconnected for simultaneous rotation by a single motor means (not shown) in well known manner. Outer sprockets 71 may be supported from idle shafts 72 in a manner similar to that described before idle shaft 35 of the prior embodiment. The outer sprockets 71 are spaced from side walls 73 of the apparatus of this invention a sufficient distance so that the end zones of the spray-treating zones will approximately touch or fall short of side walls 73.

Operation of the dual sprocket and chain arrangement of this modification of the invention is similar to that described in the prior embodiment, each nozzle means 67 producing a similar spray pattern and rapidly oscillating transversely of the path of fruit in the same manner as that above described. In this modification, however, it should be noted that the spray-treating zones of said nozzles 67 overlap beneath the inner sprockets 69 with the result that a somewhat heavier concentration of atomized spray particles may be afforded centrally of the path of fruit. Such additional concentration of spray particles at this point in the path is often desirable because fruit conveyed by rolls 15 may tend to advance in greater density per unit area in the central portion of the path rather than at the sides of the path of travel.

The modification of Fig. 5 illustrates use of the apparatus of this invention to provide a transverse subdivision of treating zone allocated to each single nozzle means. It is understood that a sprocket and chain means together with a single nozzle pivotally supported thereon may be disposed longitudinally of the path of travel of the fruit so as to increase the length of the effective treating zone. In some instances, such an installation may be desirable although it has been found that the first embodiment described efficiently and economically applies a uniform deposition of concentrated liquid substance to surfaces of the fruit.

It is important to note that nozzle means 39 is always at an equal or uniform distance from the fruit and that the area of fruit covered by the single nozzle is relatively large. The area to be covered by the nozzle within a given period of time is exactly determined and therefore exact quantities of liquid substance to be applied may be readily selected for a given amount of fruit. This determination may be made whether the width of the fruit path is wide or narrow and thus the apparatus of this invention is readily adaptable to different installations.

It will be apparent that the apparatus of this invention is simple in construction and occupies but little space. Effective use is made of the material being applied since there is little loss or runoff of material as compared to prior proposed fixed nozzle installation.

It is understood that various modifications and changes may be made in the apparatus and method of this invention and such changes and modifications which come within the scope of the appended claims are embraced thereby.

I claim:

1. In an apparatus for applying a virtually uniform deposition of concentrated liquid substance upon surfaces of fruit to virtually completely cover said surfaces, the combination of: a conveyor means including a plurality of brush rolls for advancing and agitating fruit along a given path through a treating zone; nozzle means movably supported above said path in the treating zone with the axis of the nozzle means lying normal to said path and adapted to be connected to a source of concentrated liquid substance to be applied to said fruit surfaces; and means to move said nozzle means in uniform spaced relation to said path in one direction across said given path to cover a preselected area of said path and to move said nozzle means in the opposite direction to cover another partially different preselected area of said path whereby fruit is directly bombarded by spray particles in a defined pattern in first one direction and then in the opposite direction at longitudinally spaced points in the path of movement of the fruit.

2. In an apparatus as stated in claim 1 wherein said means to move said nozzle means transversely of said path includes sprocket and chain means disposed in a horizontal plane for uniformly spacing said nozzle means from said fruit.

3. In an apparatus as stated in claim 1 wherein the spacing of said nozzle means from said fruit and the spacing of the transverse paths of said nozzle means is correlated to provide partially overlapping spray zones.

4. In an apparatus for uniformly depositing a concentrated liquid substance upon surfaces of fruit, the combination of: means to advance and agitate the fruit along a given path of selected width; applicator means to apply under superatmospheric pressure a concentrated liquid substance to said fruit surfaces and including a single atomizing nozzle in fluid communication with a supply of said concentrated liquid substance; and means pivotally mounting said nozzle with its axis vertical to rapidly transversely move said nozzle in a horizontal plane across the path of said fruit in spaced lines of travel and in opposite directions and at a preselected speed correlated to the rate of advancement of the fruit to apply more than one application of spray upon said fruit, said nozzle projecting a traveling defined cone-shaped spray of atomized particles under pressure upon said fruit surfaces and in spray zones displaced in the direction of movement of the fruit, said nozzle being spaced from said fruit surfaces a distance such that the spray pattern under pressure is intact when spray particles impinge on said fruit surfaces.

5. In an apparatus for depositing a liquid substance upon surfaces of a plurality of discrete objects to virtually completely cover said surfaces, the combination of: means including brush rolls to advance and agitate and wipe a plurality of objects along a given path of selected width; applicator means to apply a liquid substance to surfaces of said objects including a nozzle means disposed above said path a selected distance to directly and forcibly impinge spray particles in an intact spray pattern on the surfaces of said objects; means to rapidly transversely move said nozzle means back and forth in spaced pathways across said object path and in a plane parallel to said object path; and means in communication with said nozzle means to supply a liquid substance under pressure to said nozzle means.

6. In an apparatus as stated in claim 5 wherein said spaced pathways for said nozzle means are spaced apart a distance whereby spray of particles from the nozzle means into a spray zone along one pathway partially overlaps the spray zone formed by spray of particles from the nozzle means along the other pathway.

7. An apparatus as stated in claim 5 wherein means to advance said objects and the means to rapidly transversely move said nozzle means along spaced pathways are correlated so that surfaces of an object are subjected to direct deposition of spray particles by more than one transverse movement of the nozzle means.

8. An apparatus for spraying a liquid substance upon surfaces of a plurality of discrete objects, comprising, in combination: a plurality of brush roll means for advancing said objects along a given path; a frame member above said path; a roller chain means and a sprocket means mounted on said frame member and extending across said path with the axes of rotation of the sprocket means vertically disposed and the lays of the chain means transversely disposed in a plane parallel to the brush roll means; a nozzle support member carried by the chain means and movable therewith around the sprocket means; and a nozzle pivotally mounted on the support member for emitting a spray pattern held intact to the object path and adapted to communicate with a source of liquid substance to be sprayed, the spacing of the nozzle above the brush roll means and the spacing apart of the lays of said chain means being correlated whereby the spray pattern of the nozzle during its movement along one lay overlaps the spray pattern formed during its movement along the other lay.

9. In an apparatus for forcibly depositing and wiping a liquid substance upon curvilinear surfaces of a plurality of discrete objects to virtually completely uniformly coat said surfaces, the combination of: means including a plurality of brush rolls with bristles to advance, agitate and wipe against surfaces of said objects while said objects move in a selected path; movable applicator means to directly forceably spray a liquid substance on said surfaces of said objects including a nozzle means spaced above said path to direct a predetermined intact spray pattern upon said surfaces; means to move said nozzle means across said object path at a relatively rapid speed with respect to the rate of advancement of the objects whereby each object is subjected to at least three passes of said intact spray pattern; and means to supply a liquid substance under high pressure to said nozzle means.

10. In an apparatus for applying concentrated waxy substances upon fruit or the like, the combination of: a plurality of brush rolls to advance and agitate fruit to be treated along a selected path and at a predetermined rate of advancement; a nozzle means spaced above said path and movable thereacross in at least two pathways spaced in the direction of movement of said fruit; means to supply a liquid substance to said nozzle under high pressure, said spacing of said nozzle means above said path providing an intact spray pattern at the path of the fruit whereby spray particles directly and forcibly impinge against fruit surfaces; and means to move said nozzle means across the path of said fruit at a rapid speed whereby said intact spray pattern impinges against said fruit with each spray particle having a downward and sideward component of motion.

11. In an apparatus for treating fruit, the combination of: a conveyor means including brush rolls to advance and simultaneously agitate and wipe a plurality of fruit as they travel along a path at a selected speed; means forming a treating chamber about a portion of said conveyor means; sprocket and chain means supported from said chamber forming means and disposed transversely to said path and with lays of said sprocket and chain means lying in a horizontal plane; a nozzle means supported by the chain means for movement therewith; said lays defining parallel transverse pathways for said nozzle means spaced longitudinally of the path of said fruit; a supply source of a waxy liquid substance in communication with said nozzle means; and drive means for said sprocket and chain means to move said nozzle means rapidly transversely of said path and at a preselected speed correlated to the rate of advancement of said fruit whereby more than one application of spray emitted from said nozzle means impinges upon each of said plurality of fruit; said sprocket and chain means including a plurality of transversely aligned sprocket and chain assemblies and said nozzle means includes a single pivoted nozzle connected to each chain assembly.

12. In an apparatus for uniformly depositing a liquid substance upon surfaces of fruit, the combination of: means to advance and agitate the fruit along a given path of selected width; applicator means to apply under superatmospheric pressure a liquid substance to said fruit surfaces and including a single atomizing nozzle in fluid communication with a supply of said liquid substance; and means mounting said nozzle with its axis directed toward said path of said fruit to rapidly and repeatedly move said nozzle across and above the path of said fruit in uniform spaced relation thereto in spaced lines of travel and in opposite directions, the speed of the nozzle being correlated to the rate of advancement of the fruit for applying more than one application of spray upon each of said fruit, said nozzle projecting a traveling, defined, cone-shaped spray of atomized particles under pressure upon said fruit surfaces to spray zones displaced along the path of the fruit, said nozzle being spaced from said fruit surfaces a distance such that the spray pattern under pressure is intact when spray particles impinge on said fruit surfaces.

13. An apparatus as stated in claim 12, wherein said nozzle is pivotally mounted.

References Cited in the file of this patent
UNITED STATES PATENTS

| | | |
|---|---|---|
| 1,672,737 | Skinner | June 5, 1928 |
| 2,119,914 | Holzcker | June 7, 1938 |
| 2,281,169 | Pattison | Apr. 28, 1942 |
| 2,285,841 | Sharma | June 9, 1942 |
| 2,505,179 | Gaythwaite | Apr. 25, 1950 |
| 2,531,093 | Walker | Nov. 21, 1950 |
| 2,535,860 | Michaelis et al. | Dec. 26, 1950 |
| 2,555,237 | MacPherson | May 29, 1951 |
| 2,588,125 | Knowland et al. | Mar. 4, 1952 |
| 2,595,151 | Lockwood | Apr. 29, 1952 |
| 2,700,953 | Howe et al. | Feb. 1, 1955 |
| 2,703,760 | Cunning | Mar. 8, 1955 |
| 2,738,761 | Gerwe | Mar. 20, 1956 |
| 2,755,189 | Gericks | July 17, 1956 |